July 27, 1965  D. B. CARTER  3,196,508
LICENSE PLATE FASTENERS
Filed Dec. 20, 1961
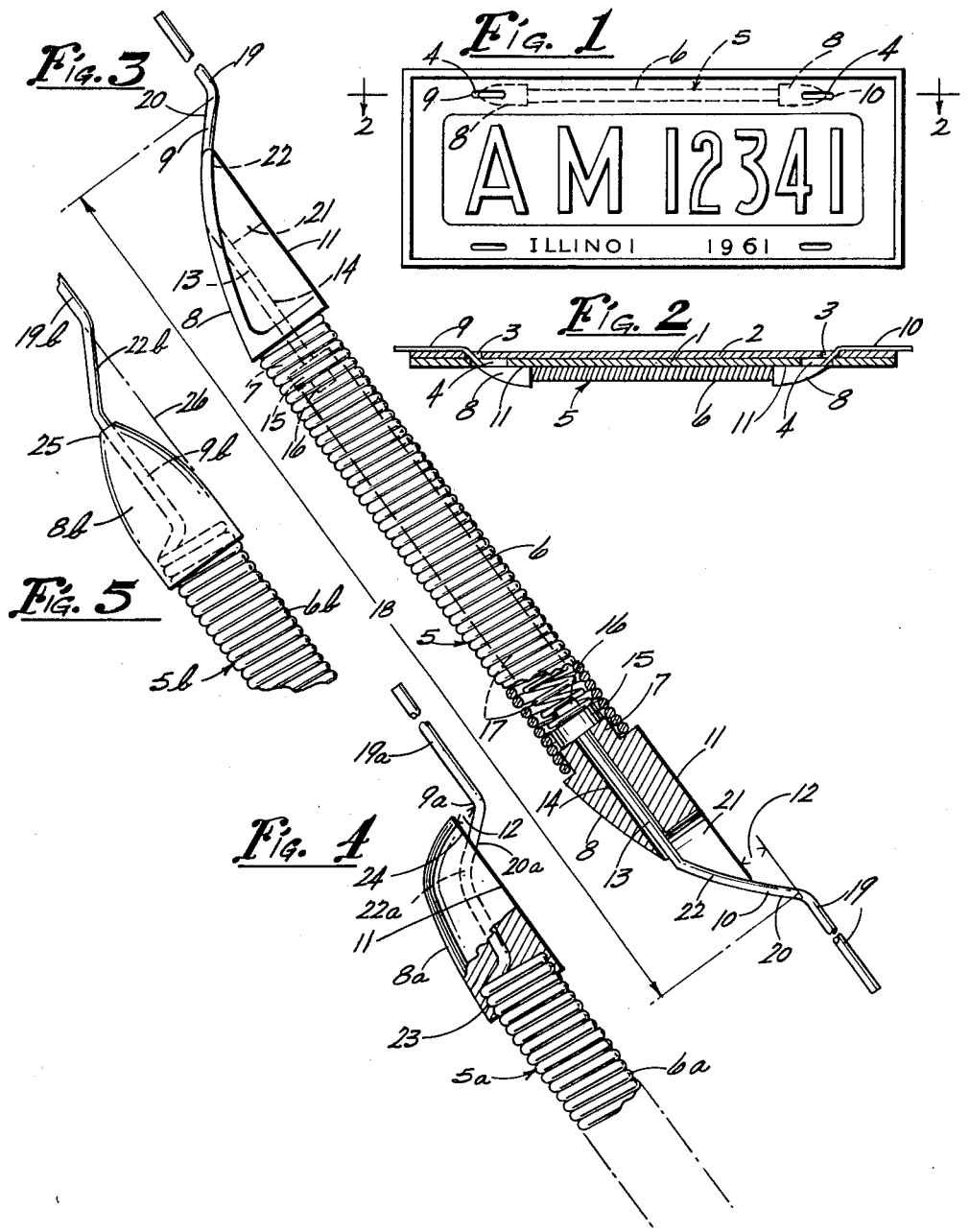
INVENTOR
D. BENTON CARTER
ATTY.

United States Patent Office 3,196,508
Patented July 27, 1965

3,196,508
LICENSE PLATE FASTENERS
D. Benton Carter, 3423 N. Central Ave., Rockford, Ill.
Filed Dec. 20, 1961, Ser. No. 160,788
12 Claims. (Cl. 24—73)

This invention relates to quickly connectable and disconnectable license plate fasteners especially designed to meet the needs of automobile dealers when temporarily applying license plates to motor vehicles during the period of demonstration and try-out by the prospective customer.

The principal object of my invention is to provide a simple and inexpensive type of fastener of the kind mentioned, quickly and easily attachable and detachable while nevertheless holding the license plate quite securely and without any likelihood of its rattling when the vehicle is in motion even over rough roads, and also without likelihood of an unauthorized person removing the plates, the fasteners furthermore presenting a neat and attractive appearance so as not to detract from the appearance of the car or truck to which the plates are applied.

The invention is illustrated in the accompanying drawing in which

FIG. 1 is a face view of an automobile license plate indicating in dotted lines a license plate fastener made in accordance with my invention;

FIG. 2 is a section on the line 2—2 of FIG. 1 showing the license plate fastener in plan view;

FIG. 3 is a full size plan view of the fastener shown in FIG. 2 showing one end portion in horizontal section on the line 2—2 of FIG. 1 to better illustrate the construction, intermediate portions of the wires on opposite ends of the fastener being broken away to conserve space and enable showing the construction on such a large scale;

FIG. 4 is a sectional detail of one end portion of another construction, and

FIG. 5 is a plan view of an end portion of still another construction.

Similar reference numerals are applied to corresponding parts throughout these views.

Referring to FIGS. 1 and 2, 1 is the license plate and 2 the usual supporting bracket on the car, the latter having bolt holes 3 which register with slots 4 in the plate to accommodate the usual bolts. However, a car dealer, who may want to put the plates on only for a demonstration drive wants and needs a fastener like this invention provides—that is quickly applicable and as quickly removable, and yet holds the plate securely enough so it will not be apt to rattle or fall off even in driving over a rough road. The fastener is shown at 5.

Fastener 5 consists of a fairly stiff, closely coiled helical spring 6 of relatively heavy wire, suitably secured at its opposite ends to reduce neck portions 7 on flat-backed ornamental and decorative heads 8, which are nicely tapered toward the outer ends as indicated in FIG. 1, and have wires 9 and 10 extending therefrom in alignment with the longitudinal center line of the spring 6 for extension through the slots 4 in the plate 1 and through the bolt holes 3 in the bracket 2 to fasten the license plate to the bracket in the manner shown in FIGS. 1 and 2, the flat-backs 11 on the heads 8, which are in coplanar relationship, being disposed in snug engagement with the outer face of the license plate, as seen in FIG. 2, so that there is no danger of the plate rattling when the vehicle is in motion, the dimension indicated at 12 being slightly less than the combined thickness of the license plate 1 and bracket 2 to insure a tight hold and one in which the spring 6, which is slightly arched outwardly relative to the plate 1 and bracket 2 as a result of this assembled relationship, exerts pressure inwardly resiliently on the heads 8 to reduce any likelihood of rattling and eliminate any likelihood of the plate falling off accidentally.

The wires 9 and 10 have their inner end portions 13 slidable in longitudinally extending bores 14 provided in the heads 8, so that cyindrical knobs 15 that are suitably secured to the inner ends thereof and which have reduced neck portions 16 provided on their inner ends for centering engagement in the ends of a coiled compression spring 17 fitting loosely inside the spring 6 will compress it by inward movement of either one of the two wires 9 and 10 to obtain whatever reduction from the original dimension 18 between the inner ends of the opposed outer end portions 19 is necessary in the application of the fastener to any given license place and bracket, and accordingly insure outward pressure at the junctions 20 in the slots 4 and holes 3 to further eliminate any likelihood of looseness of the plate and consequent rattling. Longitudinal slots 21 in the tapered outer end portions of the heads 8 serve the double purpose of allowing limited reciprocation of the rearwardly bent intermediate portions 22 of the wires 9 and 10 relative to the heads 8 as required for the kind of operation just described and also hold these wires against turning relative to the heads, so that the outer end portions 19 are maintained in fairly close alignment in the plane of the longitudinal center line of the spring 6, corresponding to the line 2—2 in FIG. 1.

In operation, first the wire at one end of the fastener 5, as for example wire 9, is entered through the one slot 4 and hole 3, and the wire 10 at the other end is entered in the other slot 4 and hole 3 by buckling the spring 6 to a generally U-shape. That explains the need for the end portions 19 being elongated to the extent indicated in FIG. 2, namely, to reach the hole 3 when the spring 6 is arched to U-shape. The bent portions 22 cooperate in this operation in the matter of permitting compression of the spring 17 to a certain extent by inward pressure on the wires 9 and 10 as the extremities 19 are entered in the holes 3. Hence, when the spring 6 recoils to its normal straight form, the overall dimension between the portions 20 is somewhat less than the dimension indicated at 18 in FIG. 3, and consequently the license plate is held tightly but resiliently and there is no likelihood of the plate falling off or even rattling. There is also not much likelihood of an unauthorized person removing the plates, because to the casual observer there is nothing to indicate that this is a temporary fastening and hence there is nothing to tempt the would-be thief or vandal.

The other two constructions shown in FIGS. 4 and 5 are simplified variations of the construction just described, which can be produced at much lower cost and which give nearly the same advantages. The form 5a shown in FIG. 4 has the wires 9 and 10 at opposite ends provided as integral extensions of the spring 6a as indicated at 9a, the head 8a being molded onto the end of the spring as shown at 23, the aligned end portions 19a having their junction portions 20a offset inwardly with respect to the outer end portions 24 of the heads 8a so that these portions 24 serve to cover up the slots 4, making the method of assembly of the fastener not nearly as apparent to the passerby as it might otherwise be and thereby reducing likelihood of an unauthorized person removing the license plate. Approximately the same dimension 12 applies for the spacing of the aligned end portions 19a with respect to the flat back faces 11 of the heads 8a.

The fastener 5b shown in FIG. 5 is similar to that shown in FIG. 4 but in this case the heads 8b are bullet-shaped and molded onto the end portions of the spring 6b, similarly as in the construction of FIG. 4 but the wires 9 and 10 at the opposite ends of the spring are disposed on the center line of the spring 6b as indicated at 9b and project from the pointed ends 25 of the heads, the bent portions 22b being outside the heads instead of inside as indicated at 22a in FIG. 4, and the aligned end portions 19b in this form being disposed immediately behind the plane of the rounded backs of the heads 8b as indicated by the line 26, whereby to maintain the spring 6b in a slightly arched condition when the fastener is applied to the license plate and accordingly insure a tight hold and one which will not permit rattle.

It is believed the foregoing description conveys a good understanding of the objects and advantages of my invention. The appended claims have been drawn to cover all legitimate modifications and adaptations.

I claim:

1. In a license plate fastener adapted for application to an assembly including a bracket or other support having holes provided therein and a license plate having two holes for reception of fasteners provided therein in widely and longitudinally spaced relation, an elongated closely coiled spring of a diameter and size of wire tending to stay normally straight, said spring in straight condition being of a length to reach from one of said holes approximately to the other but being adapted to be buckled intermediate its ends or near either end to permit application to a license plate assembly, heads rigid with the opposite ends of said spring and disposed for abutment with a flat surfaec on one side of the license plate assembly, and rigid elongated extensions extending beyond the outer ends of the heads on opposite ends of said spring which when the spring is buckled have their extremities brought closer together enough to permit entering the same through the holes in the plate and through registering holes in the plate supporting bracket or other support, whereby upon return of the spring to substantially straight form to secure the plate in place on the bracket or other support by engagement of the heads on a flat surface on one side of the license plate assembly and engagement of the extensions on the other side of the license plate assembly.

2. A license plate fastener as set forth in claim 1 wherein the outer end portions of said extensions in the straight condition of the spring are substantially coaxial and aligned longitudinally with respect to one another in a plane through the longitudinal center line of the spring and offset in substantially parallel relation to said spring, and the inner end portions of said extensions between the ends of the spring and the offset portions extend in outwardly diverging relationship to one another at acute angles with respect to the longitudinal center line of the spring so as to dispose the offset portions in a plane in a predetermined spaced relation to the adjacent sides of the heads.

3. A license plate fastener as set forth in claim 2 wherein the predetermined spacing of the offset portions relative to the heads is equivalent approximately to the combined thicknesses of the license plate assembly consisting of the license plate and bracket or other support.

4. In a license plate fastener adapted for application to an assembly including a bracket or other support having holes provided therein and a license plate having two holes for reception of fasteners provided therein in widely and longitudinally spaced relation, an elongated closely coiled spring of a diameter and size of wire tending to stay normally straight, said spring in straight condition being of a length to reach from one of said last mentioned holes approximately to the other but being adapted to be buckled intermediate its ends or near either end to permit application to a license plate, heads rigid with the opposite ends of said spring, and rigid elongated spring extensions extending beyond the outer ends of the heads on opposite ends of said spring which when the spring is buckled have their extremities brought closer together enough to permit entering the same through the holes in the plate and through registering holes in the plate supporting bracket or other support, whereby upon return of the spring to substantially straight form to secure the plate in place on the bracket or other support by engagement of the heads on a flat surface on one side of the license plate assembly and engagement of the extensions on the other sides of said assembly, the extensions in the straight condition of the spring being substantially aligned longitudinally with respect to one another in a plane through the longitudinal center line of the spring, the backs of said heads being flat and in coplanar relationship and said extensions being disposed in a plane parallel with said flat back surfaces, at least one of the extensions being on a part separate from the spring and movable endwise relative thereto and spring pressed outwardly with respect to the adjacent end of the spring by means of a coiled inner compression spring housed inside the first mentioned spring, the head at this end of the spring providing a longitudinal guide therein slidably receiving the extension, the head positively limiting outward movement of said extension under action of said inner spring.

5. In a license plate fastener adapted for application to an assembly including a bracket or other support having holes provided therein and a license plate having two holes for reception of fasteners provided therein in widely and longitudinally spaced relation, an elongated closely coiled spring of a diameter and size of wire tending to stay normally straight, said spring in straight condition being of a length to reach from one of said last mentioned holes approximately to the other but being adapted to be buckled intermediate its ends or near either end to permit application to a license plate, heads rigid with the opposite ends of said spring, and rigid elongated spring extensions extending beyond the outer ends of the heads on opposite ends of said spring which when the spring is buckled have their extremities brought closer together enough to permit entering the same through the holes in the plate and through registering holes in the plate supporting bracket or other support, whereby upon return of the spring to substantially straight form to secure the plate in place on the bracket or other support by engagement of the heads on a flat surface on one side of the license plate assembly and engagement of the extensions on the other sides of said assembly, the extensions in the straight condition of the spring being substantially aligned longitudinally with respect to one another in a plane through the longitudinal center line of the spring, the backs of said heads being flat and in coplanar relationship and said extensions being disposed in a plane parallel with said flat back surfaces, at least one of the extensions being on a part separate from the spring and movable endwise relative thereto and spring pressed outwardly with respect to the adjacent end of the spring by means of a coiled inner compression spring housed inside the first mentioned spring, the head at this end of the spring providing a longitudinal guide therein slidably receiving the extension, the head positively limiting outward movement of said extension under action of said inner spring, the plane of the extensions being spaced from the plane of said flat back surfaces a distance equivalent approximately to the combined thicknesses of the license plate and bracket or other support.

6. A license plate fastener as set forth in claim 1 wherein the heads are cylindrical and tapered outwardly to a point, said extensions extending from the pointed outer ends of the heads but having the major portion of their length offset inwardly relative to the pointed ends of said heads and disposed in a plane parallel to the axis of said heads.

7. In a license plate fastener adapted for application to a license plate having two holes for reception of fasteners provided therein in widely and longitudinally spaced relation, an elongated closely coiled spring of a diameter and size of wire tending to stay normally straight, said spring in straight condition being of a length to reach from one of said holes approximately to the other but being adapted to be buckled intermediate its ends or near either end to permit application to a license plate, and rigid elongated outward extensions on opposite ends of said spring which when the spring is buckled have their extremities brought closer together enough to permit entering the same through the holes in the plate and through registering holes in a plate supporting bracket or other support, whereby upon return of the spring to substantially straight form to secure the plate in place on the bracket or other support by engagement of the license plate fastener on the front face of the plate and engagement of the extensions on the back of the bracket or other support, or vice-versa, at least one of the extensions being on a part separate from the spring and movable endwise relative thereto and resiliently pressed outwardly with respect to the adjacent end of the spring by means of resilient means housed inside the said spring.

8. In a license plate fastener adapted for application to a license plate having two holes for reception of fasteners provided therein in widely and longitudinally spaced relation, an elongated closely coiled spring of a diameter and size of wire tending to stay normally straight, said spring in straight condition being of a length to reach from one of said holes approximately to the other but being adapted to be buckled intermediate its ends or near either end to permit application to a license plate, heads rigid with the opposite ends of said spring and disposed for abutment with the front face of said license plate, and elongated aligned slender but rigid extensions extending from said heads for entry through the holes in the plate and registering holes in a plate supporting bracket or other support, said extensions being provided with offset end portions disposed for abutment with the rear face of said plate supporting bracket or other support, at least one of the extensions being on a part separate from the spring and movable endwise relative thereto and spring pressed outwardly with respect to the adjacent end of the spring by means of a coiled inner compression spring housed inside the first mentioned spring, the head at this end of the spring providing a longitudinal guide therein slidably receiving the extension, the head positively limiting outward movement of said extension under action of said inner spring.

9. A license plate fastener as set forth in claim 8 wherein at least the head through which the movable extension extends has a longitudinal slot provided therein opening to the back of the head and said extension has an angularly extending portion guided in said slot and preventing turning of said extension relative to the head and first mentioned spring and carrying an end portion offset in substantially parallel relation to said first mentioned spring, whereby to maintain the offset end portion of said extension in alignment with the offset end portion of the extension on the other end of the first mentioned spring longitudinally with respect to said spring.

10. In a license plate fastener adapted for application to a license plate having two holes for reception of fasteners provided therein in widely and longitudinally spaced relation, an elongated closely coiled spring of a diameter and size of wire tending to stay normally straight, said spring in straight condition being of a length to reach from one of said holes approximately to the other but being adapted to be buckled intermediate its ends or near either end to permit application to a license plate, heads rigid with the opposite ends of said spring and disposed for abutment with the front face of said license plate, and elongated aligned slender but rigid extensions extensions extending from said heads for entry through the holes in the plate and registering holes in a plate supporting bracket or other support, said extensions being provided with offset end portions disposed for abutment with the rear face of said plate supporting bracket or other support, said extensions being on parts separate from the spring and movable endwise relative to the ends thereof, said heads having guides provided therein in which said extensions are reciprocable, a smaller diameter coiled compression spring housed inside the first mentioned spring, and knobs fixed on the inner ends of said extensions and abutting the opposite ends of said inner spring and held thereby pressed against the inner ends of said heads.

11. A license plate fastener as set forth in claim 10 wherein each of said heads has a longitudinal slot provided therein opening to the back of the head, each of said extensions having an angularly extending portion guided in said slot preventing turning of said extension relative to the head and first mentioned spring, whereby to maintain the offset portion of said extension in alignment with the offset portion of the extension on the other end of the first mentioned spring longitudinally with respect to said spring.

12. In a license plate fastener adapted for application to a license plate having two holes for reception of fasteners provided therein in widely and longitudinally spaced relation, an elongated closely coiled spring of a diameter and size of wire tending to stay normally straight, said spring in straight condition being of a length to reach from one of said holes approximately to the other but being adapted to be buckled intermediate its ends or near either end to permit application to a license plate, and rigid elongated outward extensions on opposite ends of said spring which when the spring is buckled have their extremities brought closer together enough to permit entering the same through the holes in the plate and through registering holes in a plate supporting bracket or other support, whereby upon return of the spring to substantially straight form to secure the plate in place on the bracket or other support by engagement of the license plate fastener on the front face of the plate and engagement of the extensions on the back of the bracket or other support, or vice versa, said extensions being on parts separate from the spring and movable endwise relative to the ends thereof, there being resilient means housed inside said spring the opposite ends of which serve to exert pressure outwardly on said extensions resiliently relative to the end poritons of said spring.

References Cited by the Examiner
UNITED STATES PATENTS

| | | | |
|---|---|---|---|
| 1,743,693 | 1/30 | Smith. | |
| 1,893,537 | 1/33 | Cruze | 24—73 |
| 2,110,515 | 3/38 | Weaver | 189—36 X |
| 2,123,796 | 7/38 | Peters | 40—200 |
| 2,505,679 | 4/50 | Less et al. | 2—132 |

DONLEY J. STOCKING, *Primary Examiner.*

ABRAHAM G. STONE, *Examiner.*